United States Patent
Jiang et al.

(10) Patent No.: US 12,294,605 B2
(45) Date of Patent: May 6, 2025

(54) PROVIDING IDENTITY PROTECTION

(71) Applicant: Palo Alto Networks, Inc., Santa Clara, CA (US)

(72) Inventors: Karen Jiang, Edison, NJ (US); Jayleen Patricia Li, Sunnyvale, CA (US); Insiya Gunja, Cupertino, CA (US); Autumn Nguyen, Westminster, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 194 days.

(21) Appl. No.: 17/982,272

(22) Filed: Nov. 7, 2022

(65) Prior Publication Data
US 2024/0154986 A1 May 9, 2024

(51) Int. Cl.
*H04L 9/40* (2022.01)

(52) U.S. Cl.
CPC ........ *H04L 63/1433* (2013.01); *H04L 63/102* (2013.01); *H04L 63/1425* (2013.01); *H04L 63/20* (2013.01)

(58) Field of Classification Search
CPC ............... H04L 63/1433; H04L 63/102; H04L 63/1425; H04L 63/20; H04L 63/0227
USPC ............................................................ 726/1
See application file for complete search history.

(56) References Cited

U.S. PATENT DOCUMENTS

| | | | |
|---|---|---|---|
| 8,955,109 B1 * | 2/2015 | Satish | G06F 21/50 726/22 |
| 10,425,444 B2 | 9/2019 | Elworthy | |
| 2019/0268377 A1 * | 8/2019 | Parry | H04L 63/1433 |
| 2021/0185076 A1 * | 6/2021 | Miller | H04L 63/107 |
| 2021/0360032 A1 * | 11/2021 | Crabtree | H04L 63/1441 |
| 2022/0006818 A1 * | 1/2022 | Cunningham | H04L 63/14 |
| 2022/0046053 A1 | 2/2022 | Stolarz | |
| 2022/0070194 A1 * | 3/2022 | Pon | G06F 16/258 |

* cited by examiner

*Primary Examiner* — Frantz B Jean
(74) *Attorney, Agent, or Firm* — Van Pelt, Yi & James LLP

(57) ABSTRACT

Techniques for providing identity protection are disclosed. A system, process, and/or computer program product for providing identity protection includes monitoring a plurality of sites, extracting predetermined user information for a user from the plurality of monitored sites to generate a profile of the user, analyzing, using a model, the profile of the user to detect whether one or more security vulnerabilities exist for social engineering attacks for one or more enterprise resources associated with the user, and performing an action in response to the one or more detected security vulnerabilities based on a policy.

15 Claims, 10 Drawing Sheets

PROVIDING IDENTITY PROTECTION

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
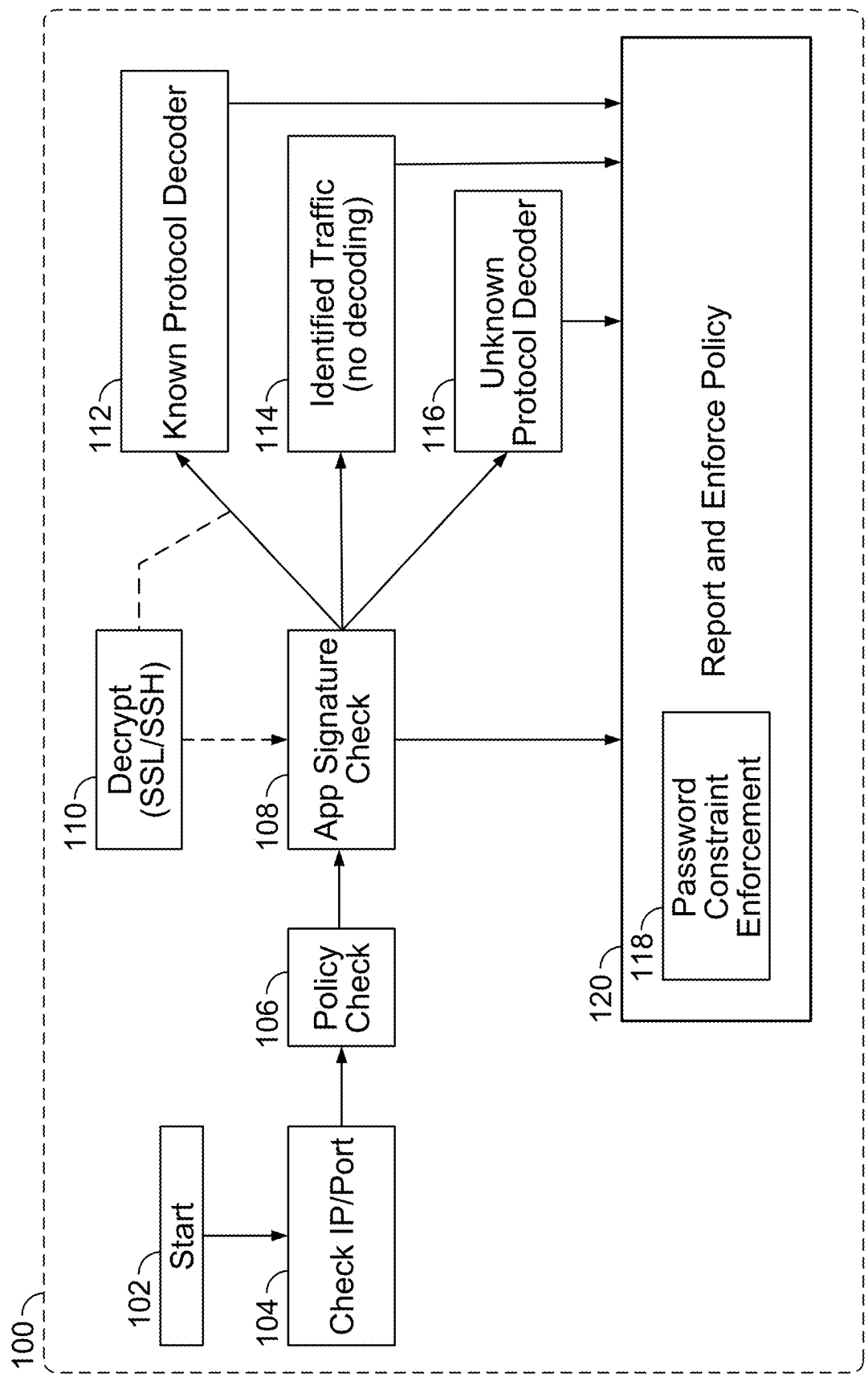
FIG. 1 is a functional diagram of an architecture of a security device that can be used for providing identity protection in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, a system/method/computer program product for providing identity protection includes monitoring a plurality of sites, extracting predetermined user information for a user from the plurality of monitored sites to generate a profile of the user, analyzing, using a model, the profile of the user to detect whether one or more security vulnerabilities exist for social engineering attacks for one or more enterprise resources associated with the user, and performing an action in response to the one or more detected security vulnerabilities based on a policy.

In some embodiments, the plurality of sites includes a social media site and/or a people search database.

In some embodiments, the analyzing of the profile of the user includes identifying relationships between the profile and enterprise resources, determining, using the model, similarities to known security vulnerabilities based on the relationships, and determining whether a security vulnerability to an enterprise resource exists based on the similarities.

In some embodiments, the action includes one or more of the following: generate an alert, generate a report, and/or generate an email.

In some embodiments, the action includes removing one or more pieces of predetermined user information from the Internet.

In some embodiments, the action includes making private a social media site, so that information associated with the user is not publicly available.

In some embodiments, the action includes adding multifactor authentication to the one or more enterprise resources associated with the user in the event that the one or more enterprise resources do not already have multifactor authentication.

In some embodiments, the system/method/computer program product further includes identifying a new social media resource attack and/or a new social engineering type attack, and updating the model based on the new social media resource attack and/or the new social engineering type attack.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Security devices (e.g., security appliances, security gateways, security services, and/or other security devices) can include various security functions (e.g., firewall, anti-malware, and intrusion prevention/detection, and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

However, weak user credentials (e.g., weak username and password credentials for user authentication) can create security vulnerabilities for enterprises. As a result, many enterprises have policies that include password complexity constraints for their internal users. For example, it can also be desirable to provide techniques that allow enterprises to enforce a policy that includes the same or similar password constraint requirements for their internal users creating authentication credentials on external sites (e.g., web sites, web services, and/or other third party/external online sites/services that require the creation of user credentials for user authentication). As another example, some enterprises may also want to enforce various other password usage polices for its internal users, such as a policy to not use the same password on multiple external sites and/or a policy to not reuse the user's enterprise password on external sites. However, because such external site authentication is generally created on a site-by-site basis that is not under the control of the enterprise (e.g., the security/IT of the enterprise), the enterprise is generally unable to automatically enforce such policies.

As a result, this problem presents a security risk for enterprises that users may also use the same and/or similar user login/password credentials for external sites. In particular, certain external sites may be compromised and/or not reputable (e.g., untrustworthy), and/or not subject to the enterprise security constraints, policies, or controls. As such, duplicating user authentication credentials as used by the user on their enterprise with external sites or duplicating user credentials across multiple external entities presents a single point of failure/security risk that the enterprise may want to avoid. Also, using weak user/password credentials on external sites also presents security risks that the enterprise may want to avoid. For example, such can pose serious security risks to an enterprise, such as for its sales personnel using external sales/CRM sites/services, its marketing personnel using an external online networking/marketing site, its users/employees using an external collaboration site/service, its users/employees using an external email site/service, and/or its users/employees using other external sites that can be used for enterprise related purposes by internal users of the enterprise.

Thus, what are needed are techniques for password constraint enforcement used in external site authentication. Accordingly, techniques for password constraint enforcement used in external site authentication are disclosed.

For example, many external sites (e.g., websites, apps for mobile devices that provide cloud/web-based services, and/or other external sites) that require user/login credentials for authentication to the external site use secure protocols (e.g., Secure Sockets Layer (SSL), HTTPS, and/or other secure/encrypted protocols) to keep the password data private (e.g., the password data is not sent in the clear over the Internet, as it is encrypted using a secure protocol). As described herein, in accordance with various embodiments, techniques are disclosed for decrypting such sessions with external sites (e.g., using a security device, such as a firewall) in order to determine if a new username and password are being communicated with an external site (e.g., un-obfuscated in a form value, and that value is frequently named 'password' or 'pass').

For example, when a firewall decrypts an SSL or HTTPS session, a decoder for the web application identifies the login/password fields that are specific to that external site (e.g., or searches for 'login' and 'password' or a regular expression (regexp) pattern match for same, if an App-ID for the external site is not available), and then the firewall can perform a password complexity check against the value that the user submitted to the external site in order to provide for password constraint enforcement used in external site authentication. Based on the results, the firewall can perform various actions in response to determining that the password complexity check reveals that the user/pass submission sent by the user was not sufficient based on the policy, such as to log a vulnerability whenever it sees a user attempting to send a non-compliant password, alerting the user that such is a non-compliant password, blocking the user from accessing the external site until adequate user/password credentials are created (e.g., injecting a block/continue page into the stream that the user would see), and/or various other actions as further described herein. For example, when a user Alice, who is an employee at ACME Company, attempts to create a username and password on an external social networking, email, or collaboration-related web site using user credentials (e.g., a username and password) that fail to satisfy a user credentials policy of ACME Company (e.g., a password complexity requirement and/or other/additional user credentials related requirements), the firewall can then detect such and perform a responsive action (e.g., alert, log, block, notify Alice to select different user credentials, suggest more complex/compliant password options to Alice to possibly select for her user credentials for that external site, and/or perform another or additional actions).

As another example, a source for the connection (e.g., user ID or address) can also be maintained in a user credentials cache of external sites and password hashes that the source has used for one or more external sites. Using such a user credentials cache, a firewall can trigger a vulnerability if the user attempts to use the same login/password combination at different external sites and/or for enterprise/internal sites (e.g., external login/password combinations should not match any internal LDAP or other internal enterprise user credentials). For example, when a user Bob, who is an employee at ACME Company, attempts to create a username and password on an external sales/CRM-related web site using user credentials (e.g., a username and password) that match (e.g., or are very similar to and/or not sufficiently different from) the user credentials that Bob uses for accessing computing/networking-related resources of ACME Company (e.g., computer logon, e-mail, LDAP, VPN, and/or other related resources), then the firewall can detect such and perform a responsive action (e.g., alert, log, block, notify Bob to select different user credentials, and/or perform another or additional actions).

As yet another example, if user credentials are known or determined to have been compromised at an external site, an enterprise can use such a user credentials cache to perform a responsive action. For example, the enterprise can require any users that have accounts with such an external site to reset their user name/password credentials, block its users from accessing that external site, and/or require any users that have accounts with such an external site to reset their user name/password credentials to be sufficiently different on any other external or internal sites (e.g., before any further access to any such sites is permitted) that such users have any identical or similar user/password credentials with that compromised external site. For example, if users Alice and Bob, who are both employees at ACME Company, had previously created an account with user credentials on an external site that has recently been compromised, then the firewall can block Alice and Bob from accessing that external site, require Alice and Bob to create new user credentials before allowing them to access that external site, and/or perform some other action (e.g., alert, log, block, and/or perform another or additional actions).

Accordingly, the various techniques described herein can facilitate the enforcement of password constraint policies to external sites that are generally not under the control of the enterprise. Such techniques can also promote and enforce proper password management policies for users of the enterprise. Also, these techniques can alert the enterprise (e.g., internal IT/security admins of the enterprise) to users who have passwords to external sites that present potential security risks for the enterprise.

Typically, data that is made available publicly makes one vulnerable to an attack. Personal information can be used by malicious actors to create or access, for example, credit card accounts or bank accounts to create fraudulent tax statements or health records, or to even apply for loans on behalf of other people. In other words, personal data can be used to craft social engineering attacks. For example, in July 2020, there was a Twitter hack, where high profile, personal Twitter accounts, such as those Twitter accounts of Presidents Obama and Biden, were breached. In the Twitter hack, Twitter employees were tricked into giving over their own account credentials over phone calls that allowed these malicious actors to access compromised Twitter accounts. Subsequently, the hackers were able to download data, access internal messaging systems, and make posts requesting donations to fraudulent accounts, from these compromised Twitter accounts.

These malicious actors were able to perform many internal actions, and all of the breaches arose from social engineering incidents involving a few individuals' accessible data through the phone calls. The present application addresses securing an individual's publicly available data to reduce the likelihood of compromising their own account and corporate resources. Information accumulated about employees' personal data availability and vulnerabilities associated with risks associated with the employees' personal data can be used to provide intelligence on social engineering threat detection.

FIG. 1 is a functional diagram of an architecture of a security device that can be used for providing identity protection in accordance with some embodiments. As shown in FIG. 1, network traffic is monitored at a firewall 100. In some embodiments, network traffic is monitored using a data appliance (e.g., a data appliance that includes security functions, such as a security device/appliance that includes a firewall). In some embodiments, network traffic is monitored using a gateway (e.g., a gateway that includes security functions, such as a security gateway). In some embodiments, the network traffic is monitored using pass through (e.g., in line) monitoring techniques.

In some embodiments, network traffic is monitored using a state-based firewall. In some embodiments, the state-based firewall can monitor traffic flows using an APP-ID engine (e.g., App Signature Check & User ID Check 108). For example, the monitored network traffic can include HTTP traffic, HTTPS traffic, FTP traffic, SSL traffic, SSH traffic, DNS requests, unclassified application traffic (e.g., unknown application traffic), and/or other types of traffic (e.g., traffic using other types of known or unknown protocols).

As shown in FIG. 1, network traffic monitoring begins at 102. An IP address and port engine 104 determines an IP address and port number for a monitored traffic flow (e.g., a session) based on packet analysis. In some embodiments, user identification is then determined (e.g., user ID can be deduced based on the source IP address). A policy check engine 106 determines whether any policies can be applied based on the IP address and port number. As also shown in FIG. 1, an application signature check engine 108 identifies an application (e.g., using an APP-ID engine using various application signatures for identifying applications based on packet flow analysis). For example, APP-ID engine 108 can be configured to determine what type of traffic the session involves, such as HTTP traffic, HTTPS traffic, FTP traffic, SSL traffic, SSH traffic, DNS requests, unknown traffic, and various other types of traffic, and such classified traffic can be directed to an appropriate decoder, such as decoders 112, 114, and 116, to decode the classified traffic for each monitored session's traffic flow. If the monitored traffic is encrypted (e.g., encrypted using HTTPS, SSL, SSH, or another known encryption protocol), then the monitored traffic can be decrypted using a decrypt engine 110 (e.g., applying trusted man-in-the-middle techniques using a self-signed certificate). A known protocol decoder engine 112 decodes and analyzes traffic flows using known protocols (e.g., applying various signatures for the known protocol) and reports the monitored traffic analysis to a report and enforce policy engine 120. Identified traffic (no decoding required) engine 114 reports the identified traffic to the report and enforce policy engine 120. An unknown protocol decoder engine 116 decodes and analyzes traffic flows (e.g., applying various heuristics) and reports the monitored traffic analysis to the report and enforce policy engine 120.

In some embodiments, the results of the various traffic monitoring techniques using known protocol decoder engine 112, identified traffic engine 114, and unknown protocol decoder engine 116 described above are provided to report and enforce policies engine 120 (e.g., network/routing policies, security policies, and/or firewall policies). For example, firewall policies can be applied to the monitored network traffic using application identification, user identification, and/or other information to match signatures (e.g., file-based, protocol-based, and/or other types/forms of signatures for detecting malware or suspicious behavior).

In some embodiments, firewall 100 also includes a content-ID engine (not shown), and, in some embodiments, the content-ID engine's identified content is also used by report and enforce policy engine 120, possibly in various combinations with other information, such as application, user, and/or other information, to enforce various security/firewall policies/rules.

In some embodiments, firewall 100 also includes a password constraint enforcement engine 118 for providing password constraint enforcement used in external site authentication.

Figure 2:
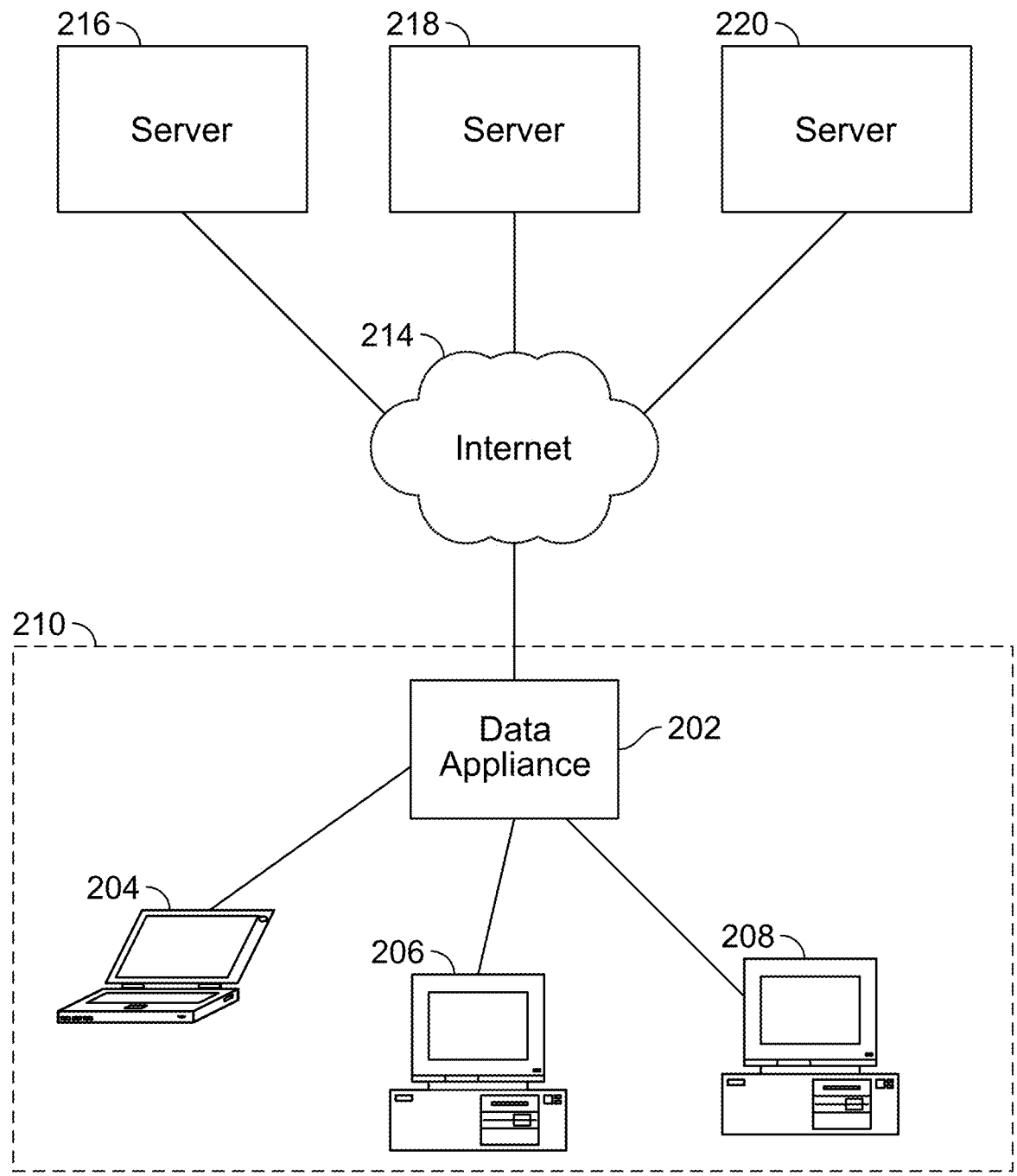
FIG. 2 is a block diagram of a network architecture that can be used for providing identity protection in accordance with some embodiments.

FIG. 2 is a block diagram of a network architecture that can be used for providing identity protection in accordance with some embodiments. As shown, a data appliance 202 (e.g., a data appliance that includes security functions, such as a security appliance/device that includes a firewall, a gateway that includes security functions, such as a security gateway, and/or any other device that includes a firewall function as described herein) is at the perimeter of a protected network 210, which includes clients 204, 206, and 208. Data appliance 202 includes a firewall function, such as firewall function 100 as described above, to protect the network and clients within the protected network 210, which is in communication with the Internet 214 and various servers, such as servers 216, 218, and 220 (e.g., web servers, mail servers, file servers, and/or other types of servers).

Figure 3A:
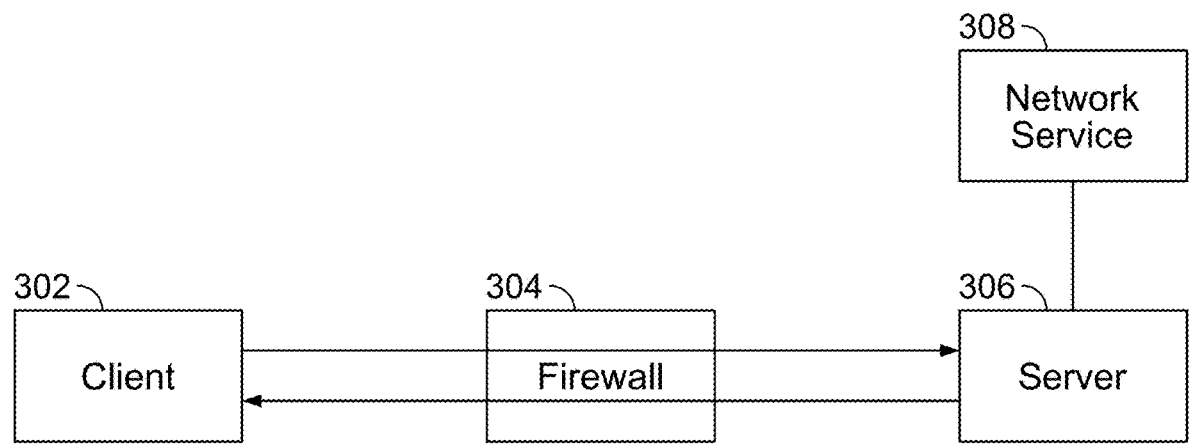
FIG. 3A is a functional block diagram illustrating a typical SSL session passing through a firewall.

FIG. 3A is a functional block diagram illustrating a typical SSL session passing through a firewall. In that session, the firewall can only inspect the handshake traffic, as all the application data is encrypted. As shown, a client 302 establishes a secure tunnel session (e.g., creates an SSL tunnel) with a remote server 306. The client 302 can use the secure tunnel with the server 306 to access a network service 308, which can be a network service activity that is in violation of one or more firewall policies/rules implemented by the firewall device 304 (e.g., a policy that includes password complexity requirements for external site authentication). However, because the secure tunnel session traffic is encrypted and passes through a firewall 304, the firewall 304 cannot decrypt the encrypted secure tunnel session traffic and, thus, cannot detect such firewall policy/rule violation(s).

Accordingly, various techniques for intercepting and decoding encrypted tunneling communications from a client to a remote server are disclosed herein. For example, a trusted man-in-the-middle technique that can be used for intercepting and decoding encrypted tunneling communications to monitor such traffic in the clear is described below with respect to FIG. 3B.

Figure 3B:
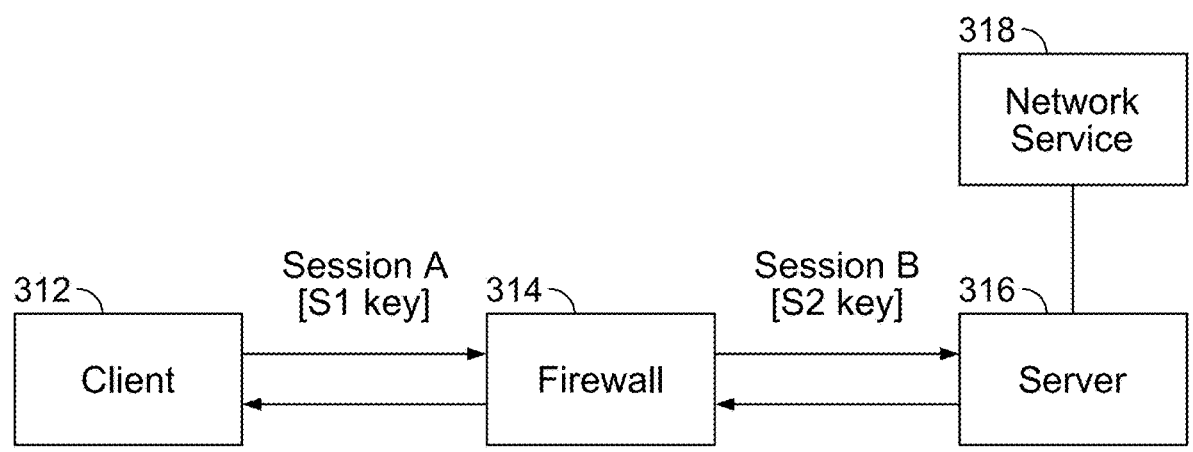
FIG. 3B is a functional block diagram illustrating the use of a firewall for providing identity protection in accordance with some embodiments.

FIG. 3B is a functional block diagram illustrating the use of a firewall for providing identity protection in accordance with some embodiments. As shown, a client 312 attempts to establish an SSL session with a remote server 316. The client 312 can attempt to use, for example, a secure tunnel with the server 316 to access a network service 318, which can be a network service activity that is in violation of one or more firewall policies/rules implemented by a firewall device 314. However, in this case, the SSL session request is intercepted and detected by the firewall 314. In response, the firewall 314 performs a trusted man-in-the-middle technique by effectively splitting the SSL session between the client 312 and the remote server 316 into two half sessions shown as Session A and Session B in FIG. 3B. In Session A, the firewall 314 acts as the remote server 316 such that it is transparent to the client 312 that it is not communicating directly with the remote server 316. Session A traffic is encrypted using the session key S1 associated with the firewall device. In Session B, the firewall 314 acts as the client 312 such that it is transparent to the remote server 316 that it is not communicating directly with the client 312. Session B traffic is encrypted using the session key S2 associated with the firewall device (e.g., the firewall device can store the fingerprint from the remote server in association with that remote server IP address). After the session set-up handshaking is completed for each of Session A and Session B, any data that is communicated from the client 312 to the firewall 314 is decrypted using a session key 51 and is then inspected by the firewall 314. If the client 312 requests a new channel to perform tunneling (e.g., a create SSL tunnel request), the firewall 314 can detect the request by the client 312 to establish an encrypted tunnel with the remote server 316. In response, the firewall 314 can perform various responsive actions. For example, the firewall 314 can deny (e.g., tear down) the entire session, the firewall 314 can send a not-supported response back to the client and avoid creation of the new tunnel (e.g., informing the client that the remote server does not support tunneling), the firewall 314 can mark the sessions as SSL-tunneling-traffic and continue to monitor the session traffic for firewall policy/rule compliance (e.g., for the life of the session, for a predetermined period of time, and/or until a predetermined event occurs), and/or the firewall 314 can perform other responsive actions or combinations of various responsive actions. In some cases, if the traffic is determined to be authorized SSL remote-access traffic, the firewall 314 encrypts the tunneled traffic using a session key S2 and forwards the encrypted traffic to the remote server 316. Similarly, traffic coming from the server is decrypted with the session key S2, inspected by the firewall 314, and then encrypted using the session key 51 and forwarded to the client 312.

Thus, using these techniques, the firewall 314 is between the client 312 and the server 316 and can present itself as the server of the session to the client and can present itself as the client of the session to the server. In this manner, the firewall 314 can inspect decrypted traffic and re-encrypt it before forwarding it to the other party. During inspection, if encrypted tunneling traffic is detected, the entire session can either be torn down or various other responsive actions can be performed as described herein. As will be apparent to one skilled in the art in view of the various techniques and embodiments described herein, while the embodiments described above are described with reference to the SSL protocol, the various techniques described herein for providing identity protection can similarly be applied to other encrypted protocols that support tunneling.

Figure 4:
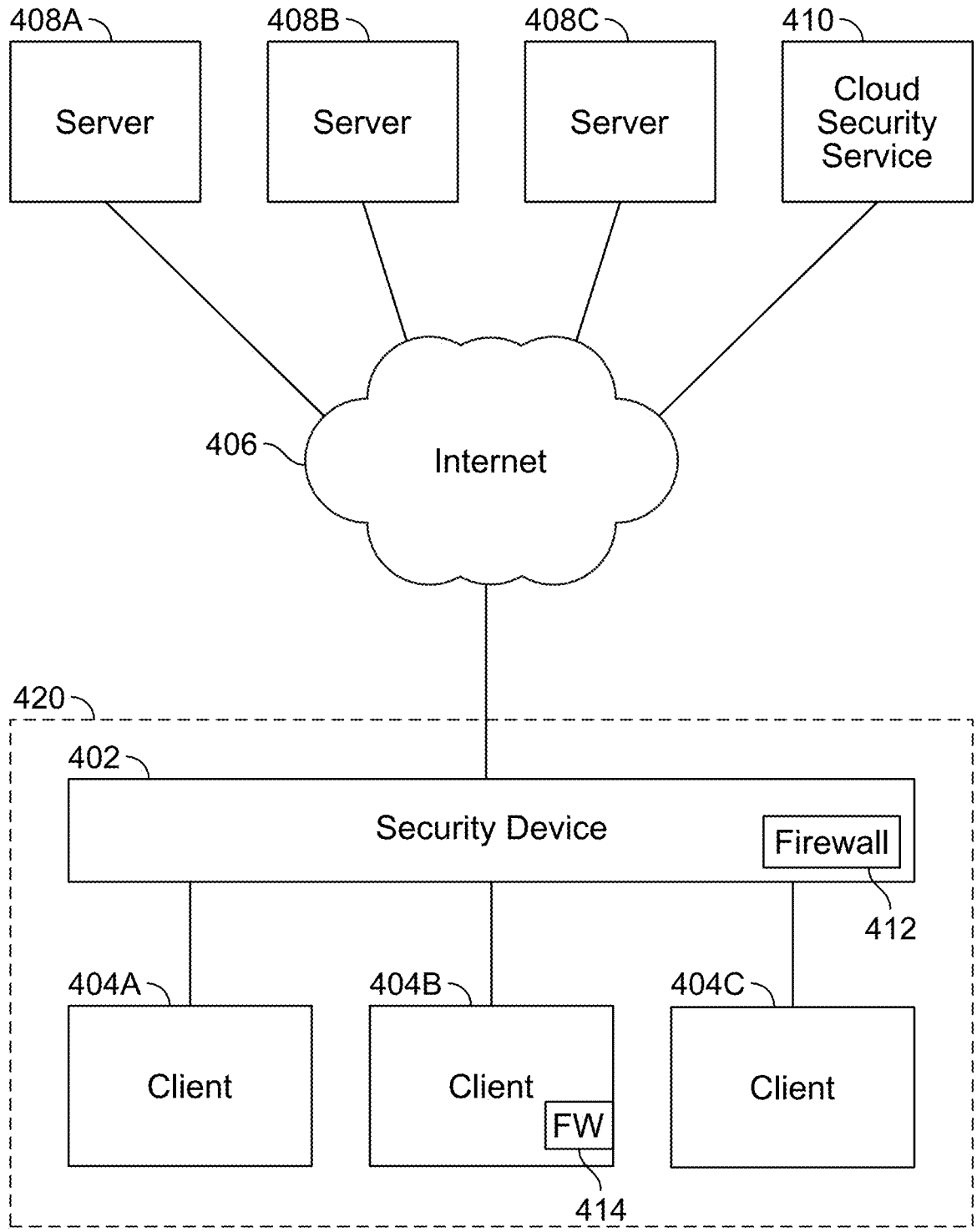
FIG. 4 is a block diagram illustrating another network architecture for providing identity protection in accordance with some embodiments.

FIG. 4 is a block diagram illustrating another network architecture for providing identity protection in accordance with some embodiments. As shown in FIG. 4, client devices 404A, 404B, and 404C are in communication with the Internet 406 via a security device 402. In some embodiments, the security device 402 includes a firewall 412 as shown, which can be used for security for enterprise network 420. In some embodiments, one or more of the client devices 404A-404C include a firewall 414 (e.g., host-based firewall) as shown. In some embodiments, the security device 402 includes a data appliance (e.g., a security appliance), a gateway (e.g., a security server), a server (e.g., a server that executes security software including firewall 412), and/or some other security device, which, for example, can be implemented using computing hardware, software, or various combinations thereof. In some embodiments, firewall 412 and/or firewall 414 perform some or all of the functions described above with respect to FIGS. 1 and 3B. For example, client devices 404A-C can include various computing devices that can access the Internet via wired and/or wireless communications, such as computer, laptops, tablets, smart phones, and/or various other types of computing devices with network communication capabilities. As also shown, servers 408A-C are in communication with the Internet 406. For example, a client device can access a service provided by a server via the Internet, such as a web-related service (e.g., web site, cloud-based services, streaming services, or email service), peer-to-peer related service (e.g., file sharing), IRC service (e.g., chat service), and/or any other service that can be delivered via the Internet.

As will now be apparent, some or all of the functions described above with respect to FIGS. 1 and 3B can be assisted by or implemented in whole or in part by the security cloud service 410. The security cloud service 410 can, for example, reduce the processing on the security device 402. As another example, detection of security policy violations and/or vulnerabilities based on password constraint enforcement used in external site authentication can be reported to the security cloud service 410 by the security device 402.

Figure 5:
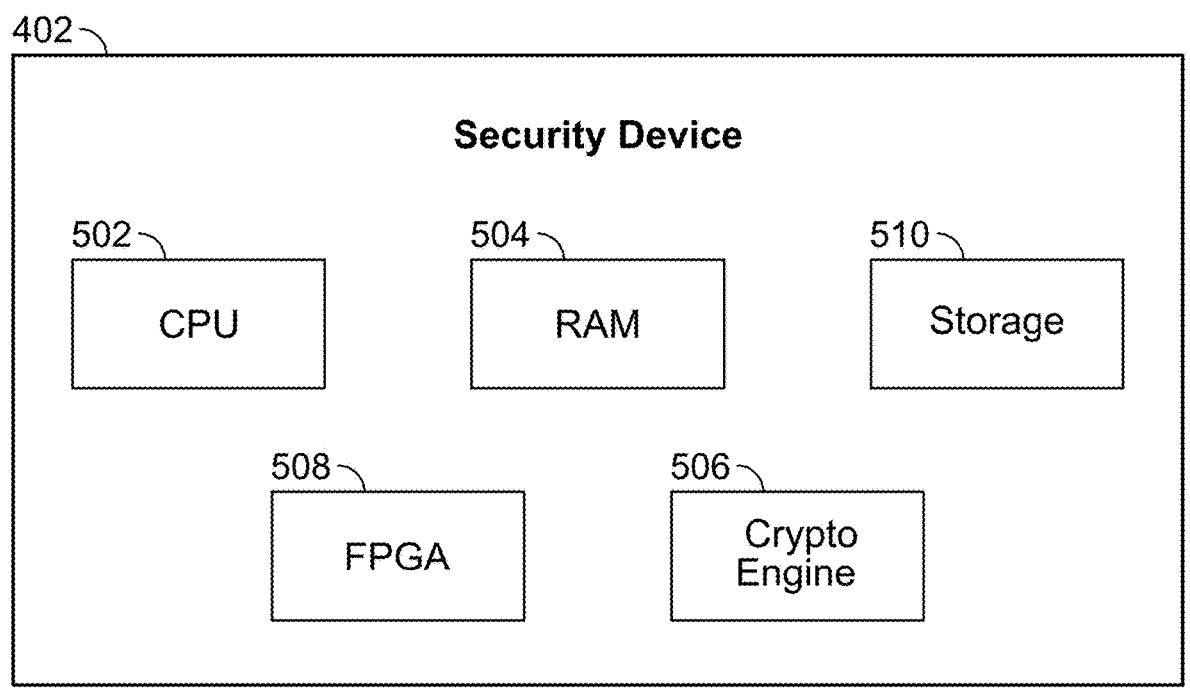
FIG. 5 is a functional diagram of hardware components of a security device for providing identity protection in accordance with some embodiments.

FIG. 5 is a functional diagram of hardware components of a security device for providing identity protection in accordance with some embodiments. The example shown is a representation of physical components that can be included in security device 402 (e.g., an appliance, gateway, or server). Specifically, security device 402 includes a high performance multi-core CPU 502 and RAM 504. Security device 402 also includes a storage 510 (e.g., one or more hard disks or solid state storage units), which is used to store policy and other configuration information as well as signatures. In some embodiments, storage 510 stores tables that include host names/identifiers and associated IP addresses and possibly other information for clients and/or remote servers identified as external sites that are monitored for providing password constraint enforcement used in external site authentication. In some embodiments, storage 510 stores a user credentials cache that includes usernames and passwords (e.g., a hash of the password data can be stored, such as using an MD5 hash or another hash algorithm) associated with each external site for each user that can be used for providing password constraint enforcement used in external site authentication. Security device 402 can also include one or more optional hardware accelerators. For example, security device 402 can include a cryptographic engine 506 configured to perform encryption and decryption operations, and one or more FPGAs 508 configured to perform signature matching, act as network processors, and/or perform other tasks.

Figure 6:
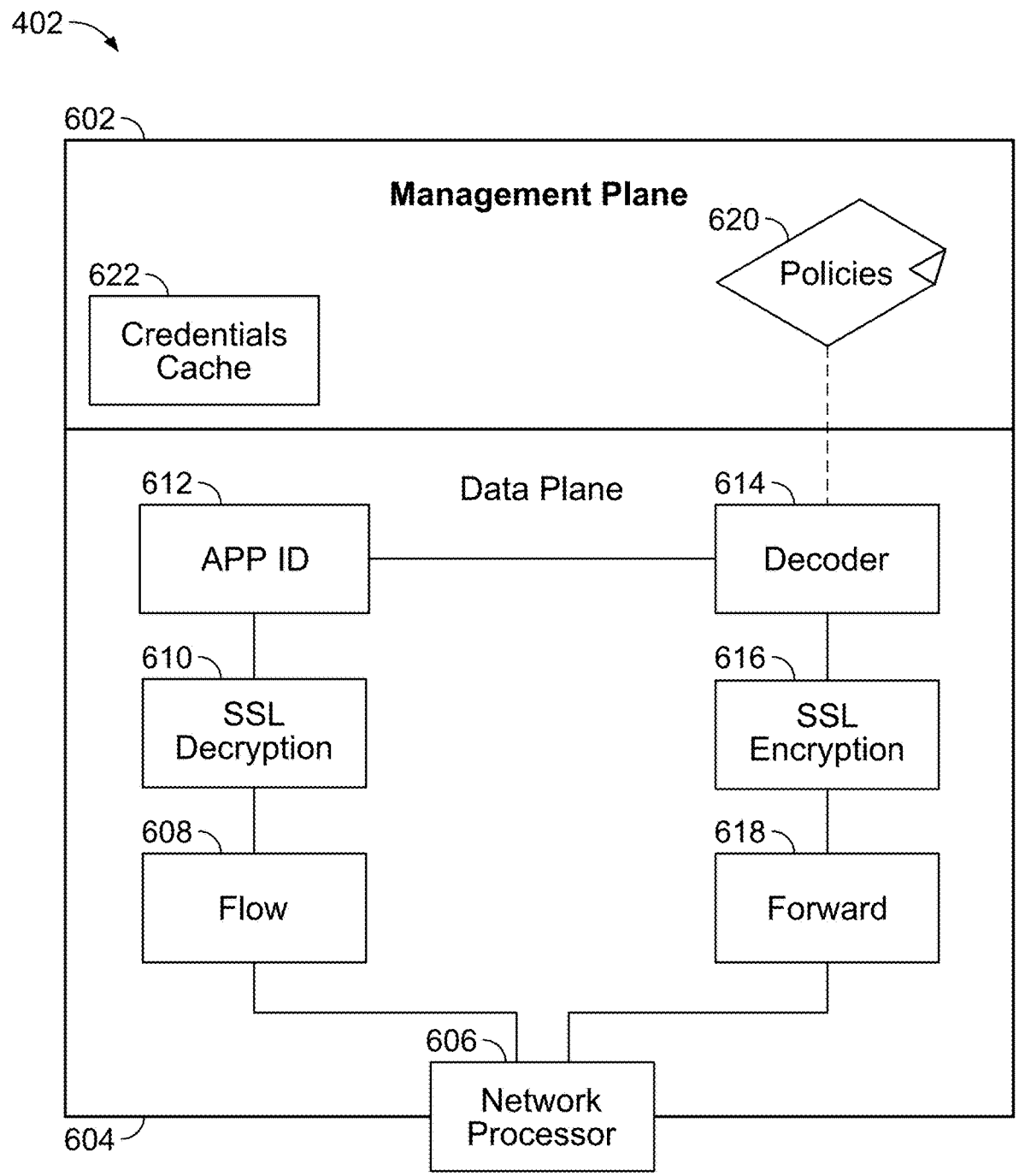
FIG. 6 is a functional diagram of logical components of a security device for providing identity protection in accordance with some embodiments.

FIG. 6 is a functional diagram of logical components of a security device for providing identity protection in accordance with some embodiments. The example shown is a representation of logical components that can be included in security device 402. As shown, security device 402 includes a management plane 602 and a data plane 604. In some embodiments, the management plane is responsible for managing user interactions, such as by providing a user interface for configuring policies and viewing log data. The data plane is responsible for managing data, such as by performing packet processing and session handling.

Suppose a client 404A attempts to access a server 408B using an encrypted session protocol, such as SSL. Network processor 606 is configured to receive packets from client 404A, and provide the packets to data plane 604 for processing. Flow 608 identifies the packets as being part of a new session and creates a new session flow. Subsequent packets will be identified as belonging to the session based on a flow lookup. If applicable, SSL decryption is applied by SSL decryption engine 610 using various techniques as described herein. Otherwise, processing by SSL decryption engine 610 is omitted. Application identification module 612 is configured to determine what type of traffic the session involves and to identify a user associated with the traffic flow. For example, application identification module 612 can recognize a GET request in the received data and conclude that the session requires an HTTP decoder. For each type of protocol, there exists a corresponding decoder 614. In some embodiments, the application identification is performed by an application identification module (e.g., APP-ID engine), and a user identification is performed by another function/engine. Based on the determination made by application identification module 612, the packets are sent to an appropriate decoder 614. Decoder 614 is configured to assemble packets (e.g., which may be received out of order) into the correct order, perform tokenization, and extract out information (e.g., to identify username/password credentials being submitted to an external site for user authentication). Decoder 614 also performs signature matching to determine what should happen to the packet. SSL encryption engine 616 performs SSL encryption using various techniques as described herein. Forwarding module 618 forwards the encrypted packet to its destination. As also shown, policies 620 are received and stored in the management plane 602. In some embodiments, policy enforcement using signatures is applied as described herein with respect to various embodiments based on the monitored, decrypted, identified, and decoded session traffic flows. In some embodiments, a credentials cache 622 is also provided for maintaining user credentials (e.g., a cache that can include usernames and passwords, such as a hash of the password data, can be stored, such as using an MD5 hash or another hash algorithm) associated with each external site for each user.

Malicious actors are more commonly weaponizing publicly available data to launch attacks against sites including corporate resources. The publicly available data can include data scraped from social media sites to be used for social engineering attacks, such as the Twitter hack that occurred in July 2020.

In some embodiments, the attacks are vendor specific and personalized to each company on what the malicious actors want to attack. As an aspect, actions can be provided to the company to improve the security of their corporate resources. Since social engineering is a fairly new risk to companies as technology has been growing and social media is getting bigger, providing security to minimize social engineering risks has been explored less than existing security technologies have been explored. The present application recognizes risky publicly available information, and performs actions in order to enhance security regarding the risky publicly available information.

Examples of risky publicly available information include name, work email, usernames, phone number, birthday, work history, home address, etc. For example, if a malicious actor wants to pretend that the malicious actor knows an employee from their university or their previous company, the malicious actor could use one or more pieces of the information against the employee in phishing emails. In another example, a malicious actor could utilize a work social network. For example, if a malicious actor has an employee's direct report, or if the malicious actor knows co-workers of Albert Smith, the malicious actor could pretend to be a co-worker to socially engineer an attack against Albert Smith. In yet another example, a company's technology, if known, could be used against the company to make it vulnerable to attack. Assume, for example, that a company uses Amazon Web Services (AWS) as their backend. If Albert Smith received an email from AWS, he would probably prioritize that email. A malicious actor could pretend to be from AWS or mention something about AWS, and trick Albert Smith into clicking on a malicious link.

In other words, the more the malicious actor knows about a person, the more likely that the malicious actor can perform a social engineering attack. Additional examples of risky publicly available information include certain likes and dislikes, travel information from social media posts, etc., which can provide the malicious actor more context into who Albert Smith is, and can also be potentially used as research for other attacks.

Personal information can used by malicious actors to access credit cards and bank accounts, create fraudulent tax statements, create fraudulent health records, apply for a loan, etc. Personal data can be the easiest data to obtain for crafting social engineering attacks. For example, the July 2020 Twitter hack where high profile attacks on the accounts of Former President Barack Obama and President Joseph Biden occurred because Twitter employees were tricked into providing their own personal information allowed hackers to download data to access internal messaging systems and then conduct fundraisers using the compromised accounts.

Figure 7:
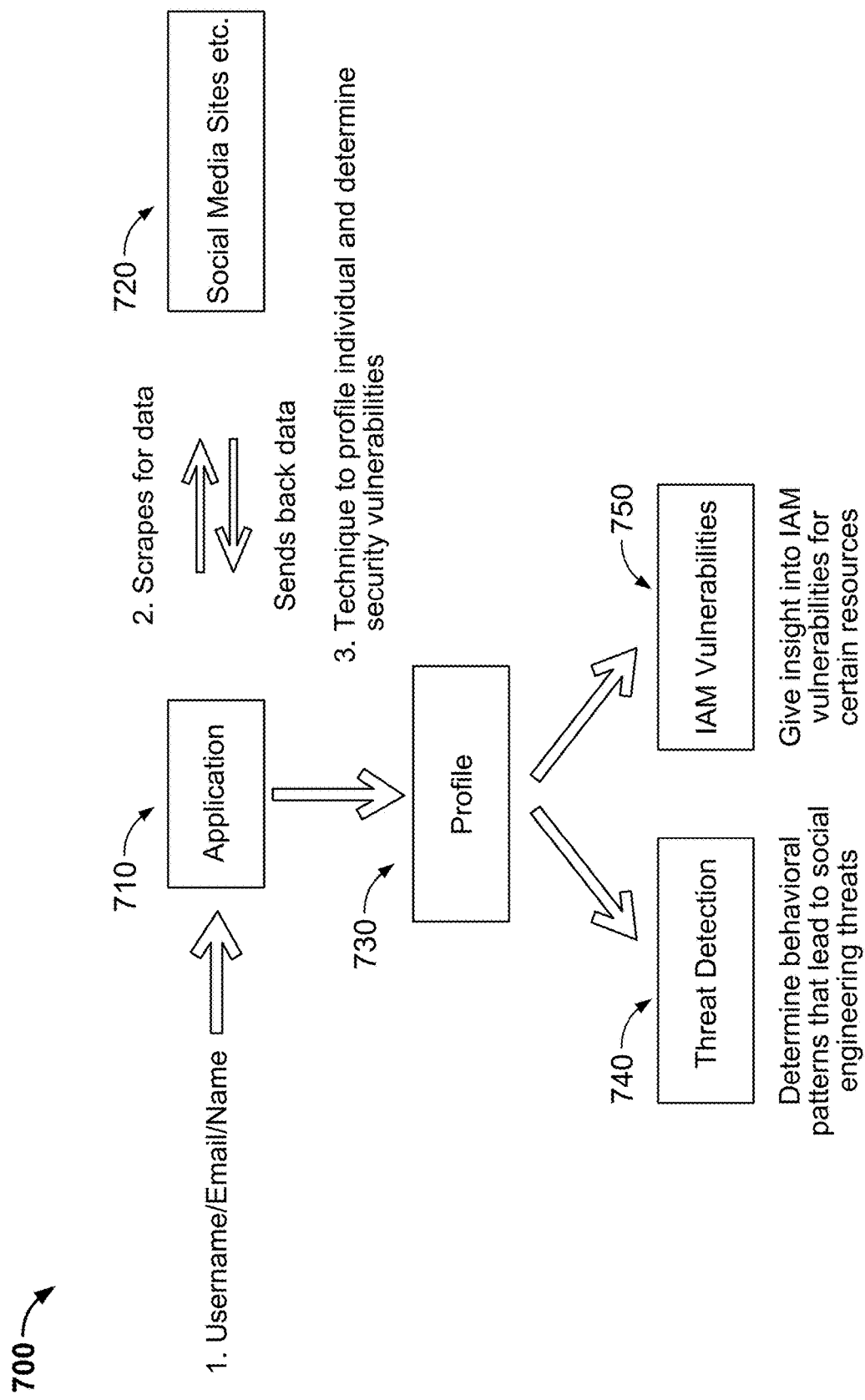
FIG. 7 is a system diagram illustrating a workflow for providing identity protection in accordance with some embodiments.

FIG. 7 is a system diagram illustrating a workflow for providing identity protection in accordance with some embodiments. In some embodiments, the workflow 700 is implemented by a server 216, 218, and/or 220 of FIG. 2, a cloud security service 410 of FIG. 4, and/or a security device 402 of FIG. 4 and comprises:

In operation 1, an application 710 receives an individual (e.g. username, email, name, etc.).

In operation 2, the application 710 scrapes personal information or data from various social media sites and/or people search databases 720 associated with the individual. The personal information includes one or more of the following: name, email, work username, phone number, education (e.g., educational institutions attended, degrees attained, etc.), address information, and/or other personal information. In some embodiments, the application 710 scrapes the personal information as an anonymous user. In some embodiments, examples of the social media sites include Facebook, LinkedIn, Instagram, etc. In some embodiments, examples of people search databases include Spokeo, Whitepages, Zoominfo, etc. In some embodiments, after the personal information or data is scraped from the various social media sites and/or the various people search databases 720, the personal information or data is returned to the application 710.

In operation 3, the application 710 performs a profile generation technique to create a profile 730 for the individual and determines security vulnerabilities based on the profile. As an example, the scraped information is organized into categories to generate a profile. For example, the categories of the profile include name, email, work username, phone number, birthday, education, work history, direct report, technologies used, social profiles matched, address, etc. In some embodiments, security vulnerabilities are determined by a ranking system to rate certain categories of personal information as more risky than other categories. In some embodiments, the ranking system rates overall information included in the profile based on how much personal information is found. In some embodiments, the information of the profile is stored in a graph, and relationships are determined by similarities in the information included in the profile, e.g., same workplace, friends/connections on various social networks, etc.

As an example, LinkedIn can be used to determine relationships. For a specific user, the application 710 can determine technologies that the user uses (e.g., Amazon Web Services (AWS), Google Cloud Platform (GCP), etc.) from the specific user's LinkedIn profile and link the technologies to the company that the user works for. Also, these relationships can reveal technologies used in building a specific product by the company. In another example, relationships determined from an employee's profile can lead to the discovery of enterprise resources that the user has access to. For example, if the user works with OKTA, that can mean that the user has access to Github, Gitlab, Jira, Confluence, etc. or if the user works with Google, that can mean that the user has access to the Google Suite of products (Google Drive, GMail, etc.).

Upon creating the profile, the profile 730 can be used to identify risky information that is publicly available, analyze the risky information to assess a risk associated with the risky information, identify enterprise resources that are vulnerable based on the assessed risk, and determine an action to mitigate the risk associated with the vulnerable enterprise resources. As an example, the enterprise resources include servers, employee confidential records, source code, customer databases, corporate financial information, employee contact information, etc.

The profile can be generated using a profile generation technique. In some embodiments, the profile generation technique fits the publicly available information into a data graph model that describes the personal identifying information about the individual to generate a profile. The profile is used to determine security vulnerabilities, which include determining threat detection 740 and identifying identity asset management (IAM) vulnerabilities 750. In some embodiment, the threat detection can be used to determine behavioral patterns that lead to social engineering threats. In some embodiments, the profile is input into a model, and the model outputs whether there is a high likelihood that a security vulnerability exists or a security vulnerability does not exist. In some embodiments, the profile is input into a model by accumulating various profiles and inputting the profiles into a database (e.g., a graph database), and the model scans the database and looks for data points that may be indicative of a security vulnerability. In some embodiments, a model utilizes a machine learning technique, such as a neural network. In some embodiments, the model is trained using a set of known security vulnerabilities. In one example of a known security vulnerability, in July 2020, Twitter was hacked, and high-profile personal accounts, such as those of Presidents Obama and Biden, were breached because Twitter employees were tricked into proving their own account credentials to a hacker over phone calls that allowed access into the compromised twitter accounts. In another example of a known security vulnerability, in September 2022, Uber was hacked where Uber internal systems were compromised by a teenage hacker who claims to have gained access to the systems by targeting a specific employee. The teenage hacker spammed employees with multi-factor authentication (MFA) login notifications for an hour and finally, using the employees' publicly available telephone number, used WhatsApp to send them a message pretending to be Uber IT to tell the employee to approve a MFA login attempt to get the notifications to stop. Other examples of a known security vulnerability include phishing, which is the practice of sending emails or messages purporting to be from reputable companies or individuals in order to induce individuals to reveal personal information, such as passwords, credit card numbers, etc. As new known security vulnerabilities are identified, the model can be updated using a machine learning technique. As the model using the machine learning technique processes more profiles, the model can become more accurate in determining which profiles are most vulnerable to attack and can rank profiles against each other. The model can continue to learn and grow as more data is fed into the model. In some embodiments, the model outputs whether the public available information is likely/not likely to be associated with a known social engineering attack, and provides a recommendation to mitigate that risk.

The scraped data can relate to employee data availability, risks in the employee data, and vulnerabilities in enterprise resources relating to the particular employee data to provide information about threat detection to improve identity and access management capabilities, and mitigate security vulnerabilities.

Figure 8:
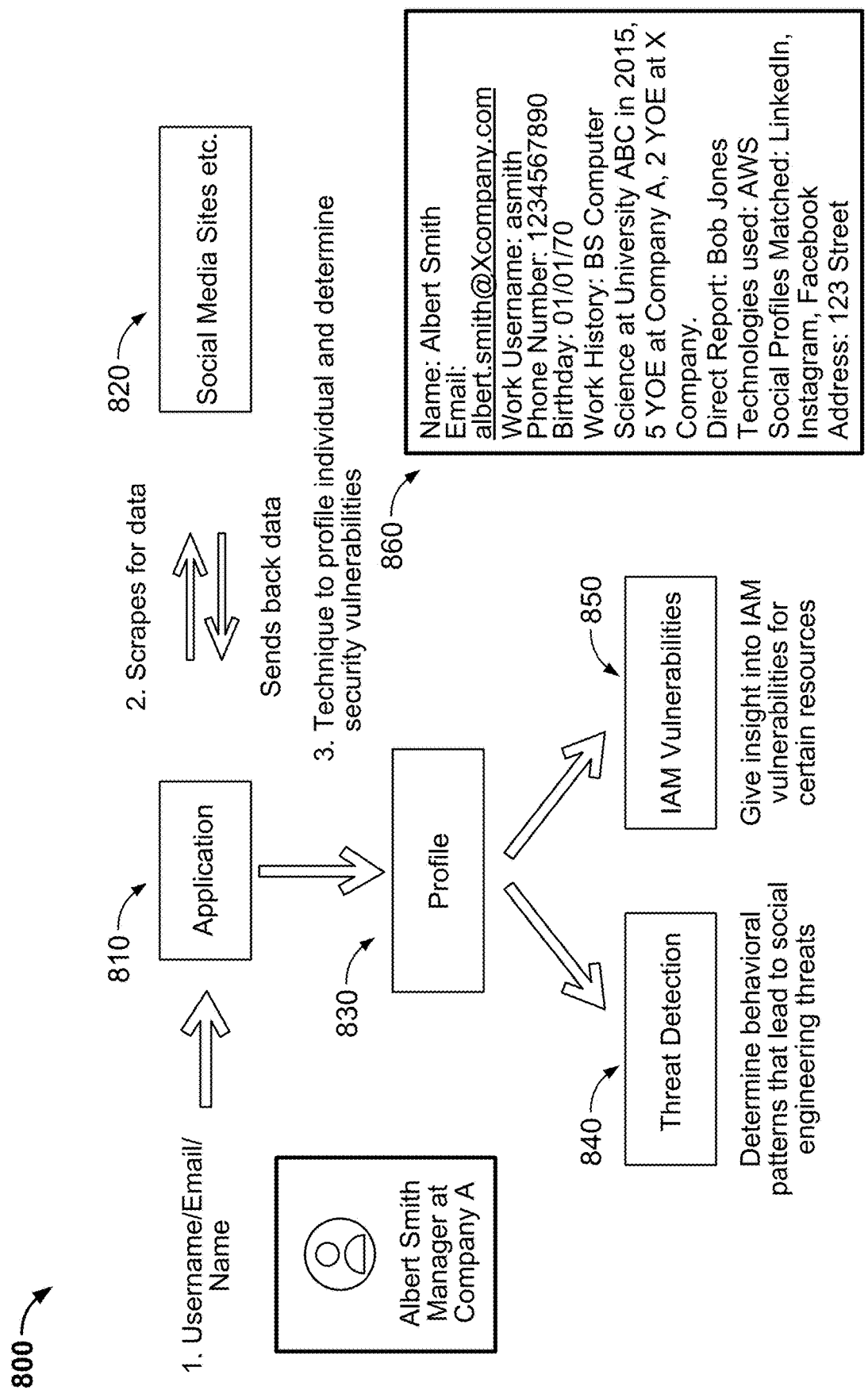
FIG. 8 is a system diagram illustrating an example of a workflow for providing identity protection.

FIG. 8 is a system diagram illustrating an example of a workflow for providing identity protection. In some embodiments, the workflow 800 is implemented by a server 216, 218, and/or 220 of FIG. 2, a cloud security service 410 of FIG. 4, and/or a security device 402 of FIG. 4 and comprises:

In the example, the workflow 800 is analogous to the workflow 700 of FIG. 7. In workflow 800, a hypothetical user—Albert Smith—is used, and he is a manager at Company A.

In operation 1, an application 810 receives an individual—Albert Smith (e.g. username, email, name, etc. relating to the individual).

In operation 2, the application 810 scrapes various social media sites and/or people search databases 820 to extract sensitive information about Albert Smith. As an example, for a given a username, email, or name, the application 810 scrapes various online sources as an anonymous user for information relating to various categories. Examples of the online sources include LinkedIn, Facebook, Instagram, etc. and external Application Programming Interfaces (APIs) can be used to scrape people search database products such as, for example, Spokeo, Whitepages, Zoominfo, etc. Examples of the types of personal and sensitive information that the application 810 is looking for include name, email, work username, phone number, work or education history, address, and other personal identifying information. Using LinkedIn as an example, Albert Smith has worked at Company A for 5 years (5 years of employment (YOE), and graduated from University ABC with a Bachelor of Science in 2015. Using Facebook as an example, the application 810 determines that Albert Smith's birthday and phone number are publicly available, and identifies Albert Smith's Instagram account (Instagram is a photo and video sharing social networking service). As an example, Albert Smith's Instagram account is set to private, so no publicly available information can be found via Albert Smith's Instagram account. As an aspect, his biography on Instagram is still viewable, and the biography does not provide any additional personal information, but an email address and a phone number are listed, so the biography can be used to confirm the phone number and the email address for Albert Smith obtained from other social media sites and/or people search databases. The application 810 can then use APIs to cross reference information to confirm the information. For example, the email address and the phone number for Albert Smith are confirmed to match the email address and phone number found from Facebook using the Facebook APIs. In FIG. 8, the box 860 on the right of the figure illustrates a set of sensitive information that was collected relating to Albert Smith. The box 860 includes Name, Email, Work Username, Phone Number, Birthday, Work History, Direct Report, Technologies Used, Social Profiles Matched, and Address.

In some embodiments, the model uses a combination of pieces of sensitive data to determine security vulnerabilities. In some embodiments, the model is a machine learning technique. For example, the machine learning technique is a neural network. In some embodiments, the model is trained using a set of known security vulnerabilities. As an example, a known security vulnerability includes a real scenario where a malicious actor used one or more particular pieces of sensitive information to access a particular enterprise resource. As an example, a malicious actor could use one or more pieces of sensitive information of an individual to exploit the individual. As an example, a phone number of the individual is obtained where a malicious actor could use the phone number to call an individual or impersonate the individual using the phone number of the individual. Other examples of pieces of information that are involved in security vulnerabilities can include role-based information, for example, managers (e.g., direct reports), coworkers, departments, etc. In another example, using a supervisor (or direct report) of an individual obtained via, for example, LinkedIn, a malicious actor could use social engineering and/or phishing to gain access to enterprise resources that the individual has access to.

Using this sensitive information, the application 810 analyzes various attacks that the malicious actor could perform and evaluates the public risk for social engineering attacks for these individuals and companies. The application 810 can take the information of a certain individual and link the information to specific resources to determine whether the resources are at risk.

The workflow 800 addresses at least two aspects. First, security vulnerabilities can be identified to protect enterprise resources. Using Albert Smith as an example, if Albert Smith's phone number is publicly exposed, a malicious actor could call this number, and impersonate someone else, e.g., a supervisor or direct report—Bob Jones, in his company, and then launch a social engineering attack to obtain things like credentials or money, from the company or from Albert Smith himself. As an example, the credentials include the login username and password to Albert Smith's work account, which can have access to sensitive information in emails, files, etc. Second, education can be provided on how to mitigate the security vulnerabilities and minimize the impact of an individual's digital footprint. Using Albert Smith's email address as an example, a malicious actor using Bob Jones' email address could send an email to Albert Smith that says that something needs to be fixed on the cloud (e.g., Amazon Web Services (AWS), Microsoft Azure, Google Cloud, etc.) and provide a link for an elaborate phishing scheme.

As an aspect, knowing information that an individual has publicly available can be used for educational purposes to see what sensitive information relating to an individual is publicly available and how the sensitive information can pose potential security vulnerabilities to a corporation. As a result, by identifying the potential security vulnerabilities, social engineering vulnerabilities can be identified.

To summarize the example, after obtaining Albert Smith's username, Albert Smith's direct report, Albert Smith's role, which is a manager, and what part of the company he might work with can be ascertained because of information provided by LinkedIn. Based on the ascertained information, a conclusion can be made that Albert Smith probably has access to a particular database. Then, the malicious actor can also look at other kinds of information such as, for example, a phone number. Additionally, friends of Albert Smith could be determined from his Facebook profile, so one or more of his friends could be impersonated to potentially manipulate Albert into providing his login credentials, or access to the particular enterprise resource. Based on all of the publicly available information, a list of potential attacks can be generated. The list of potential attacks can be used to evaluate how vulnerable a particular database is to a social engineering attack. In addition, Albert Smith is not likely to be the only person at the company who has access to this particular database. For example, Albert Smith's direct report, Bob Jones, can also have access, and some of Bob Jones' subordinates can also have access to the particular database. An entire graph can be drawn to illustrate multiple points of entry into this particular database, and the malicious actor could try to find the weakest link before launching an attack.

In operation 3, the application 810 performs a profile generation technique to create a profile for the individual and determines security vulnerabilities based on the profile.

In some embodiments, after the scraped data is obtained, a graph related to the scraped data can be generated to obtain a profile 830. Subsequently, vulnerable resources can be identified using the profile 830.

Upon creating the profile 830, the profile 830 can be used to identify risky information that is publicly available, analyze the risky information to assess a risk associated with the risky information, identify enterprise resources that are vulnerable based on the assessed risk, and determine an action to mitigate the risk associated with the vulnerable enterprise resources. In some embodiments, the profile is stored in a graph database to determine relationships with other employees' profiles.

Examples of actions include one or more of the following: generate an alert, generate a report, generate an email, etc.

Other examples of actions include removing one or more pieces of predetermined user information from the Internet, making private a social media site, so that information associated with the user is not publicly available, adding multifactor authentication to an enterprise resource associated with the user in the event that the enterprise resource does not already have multifactor authentication, providing recommendations to configure least privileged access, etc.

The profile can be generated using a profile generation technique. The profile is used to determine security vulnerabilities, which include determining threat detection 840 and identifying identity asset management (IAM) vulnerabilities 850. In some embodiments, the threat detection can be used to determine behavioral patterns that lead to social engineering threats.

In some embodiments, in the event a new social media resource attack is identified and/or a new social engineering type attack is discovered that requires different pieces of information, different combinations of information that have already been scraped, additional information, additional resources, different types of websites etc., the new information is provided to the model, and then the model is updated to generate new alerts based on the new information.

Figure 9:
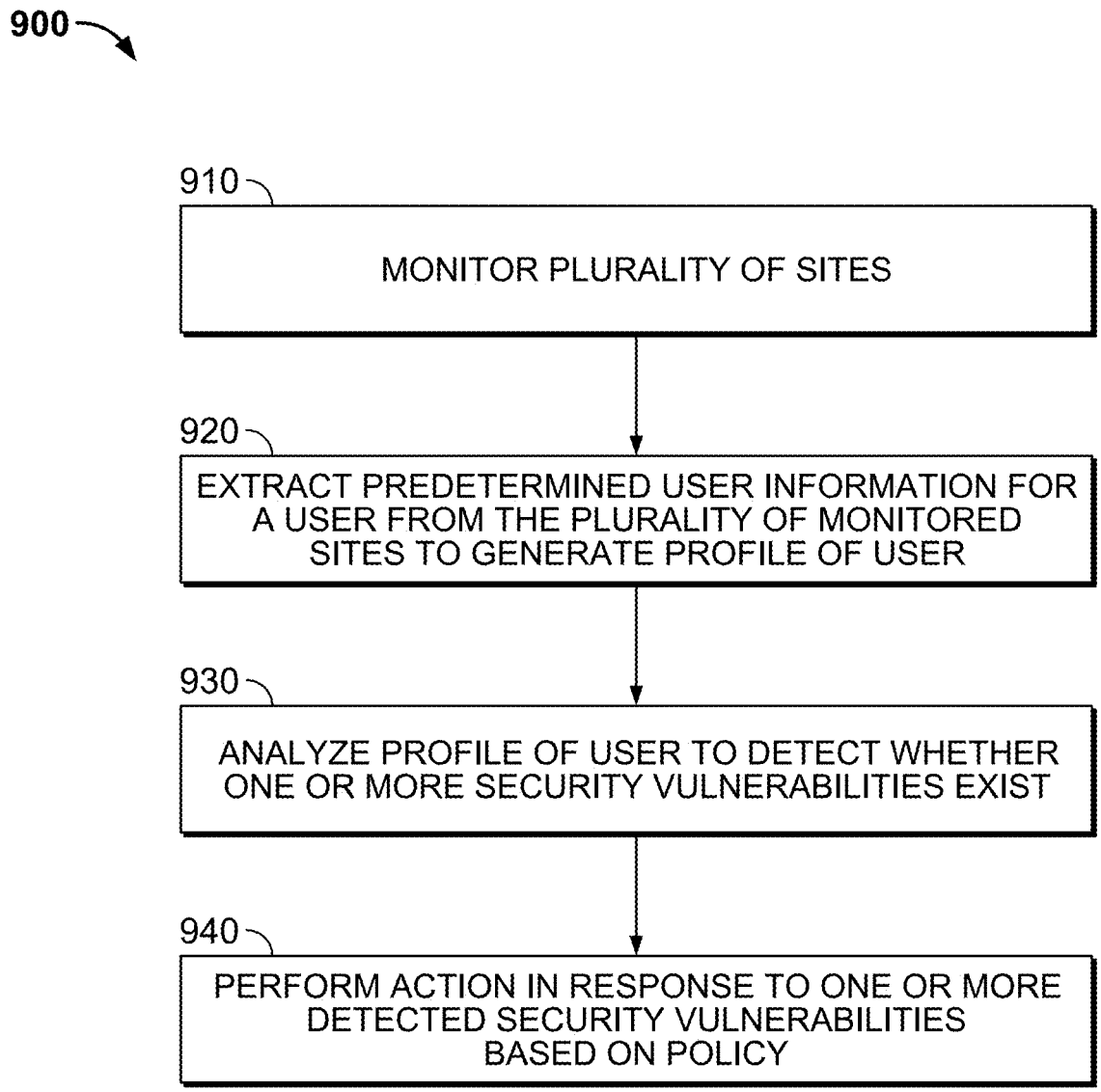
FIG. 9 is a flow diagram illustrating a process for providing identity protection in accordance with some embodiments.

FIG. 9 is a flow diagram illustrating a process for providing identity protection in accordance with some embodiments. In some embodiments, the process 900 is implemented by a server 216, 218, and/or 220 of FIG. 2, a cloud security service 410 of FIG. 4, and/or a security device 402 of FIG. 4 and comprises:

In 910, the cloud security service monitors a plurality of sites. In some embodiments, the plurality of sites includes social networking sites and/or people search databases.

In 920, the cloud security service extracts predetermined user information for a user from the plurality of monitored sites to generate a profile of the user.

In 930, the cloud security service analyzes the profile of the user to detect whether one or more security vulnerabilities exist for social engineering attacks for an enterprise resource associated with the user. In some embodiments, the analysis is performed using a model. In some embodiments, the model utilizes a machine learning technique. In some embodiments, the machine learning technique is a neural network.

In 940, the cloud security service performs an action in response to the one or more detected security vulnerabilities based on a policy.

Figure 10:
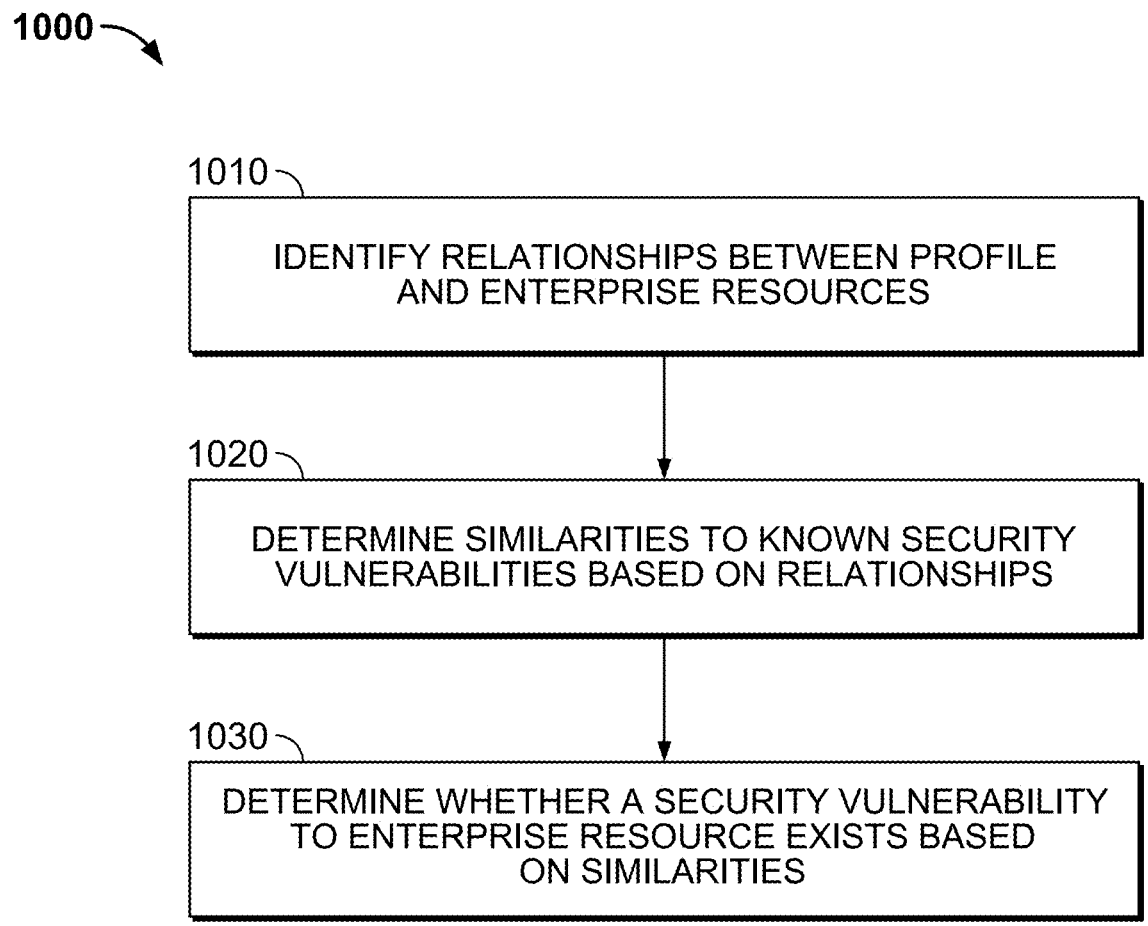
FIG. 10 is a flow diagram illustrating a process for analyzing a profile of a user to detect whether one or more security vulnerabilities exist for social engineering attacks for an enterprise resource associated with the user in accordance with some embodiments.

FIG. 10 is a flow diagram illustrating a process for analyzing a profile of a user to detect whether one or more security vulnerabilities exist for social engineering attacks for an enterprise resource associated with the user in accordance with some embodiments. In some embodiments, the process 1000 is an implementation of operation 930 and comprises:

In 1010, the cloud security service identifies relationships between the profile and enterprise resources.

In 1020, the cloud security service determines, using the model, similarities to known security vulnerabilities based on the relationships.

In 1030, the cloud security service determines whether a security vulnerability to an enterprise resource exists based on the similarities.

Some of the benefits of the present application include evaluating the public risk of social engineering attacks for an enterprise, which in turn helps to prevent future vulnerabilities of the enterprise's resources, educating users on social engineering and what information is publicly available on the Internet, providing action items to hide sensitive information on the Internet, such as warning a user that their work contact information is available on the Internet and at risk, providing information on how to remove personal information from websites that an individual themselves did not post to, utilizing as a tool to create personalized phishing trainings for employees, etc.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
monitor a plurality of sites;
extract predetermined user information for a user from the plurality of monitored sites to generate a profile of the user;
analyze, using a model, the profile of the user to detect whether one or more security vulnerabilities exist for social engineering attacks for one or more enterprise resources associated with the user, comprising to:
identify relationships between the profile and enterprise resources;
determine, using the model, similarities to known security vulnerabilities based on the relationships, wherein the model utilizes a machine learning technique, wherein the model is trained using a set of known security vulnerabilities; and
determine whether a security vulnerability to an enterprise resource exists based on the similarities; and
perform an action in response to the one or more detected security vulnerabilities based on a policy; and
a memory coupled to the processor and configured to the processor with instructions.

2. The system of claim 1, wherein the plurality of sites includes a social media site and/or a people search database.

3. The system of claim 1, wherein the action includes one or more of the following: generate an alert, generate a report, and/or generate an email.

4. The system of claim 1, wherein the action includes removing one or more pieces of the predetermined user information from the Internet.

5. The system of claim 1, wherein the action includes making private a social media site, so that information associated with the user is not publicly available.

6. The system of claim 1, wherein the action includes adding multifactor authentication to the one or more enterprise resources associated with the user in the event that the one or more enterprise resources do not already have multifactor authentication.

7. The system of claim 1, the processor further configured to:
identify a new social media resource attack and/or a new social engineering type attack; and
update the model based on the new social media resource attack and/or the new social engineering type attack.

8. A method, comprising:
monitoring a plurality of sites;
extracting, using a processor, predetermined user information for a user from the plurality of monitored sites to generate a profile of the user;
analyzing, using a model, the profile of the user to detect whether one or more security vulnerabilities exist for social engineering attacks for one or more enterprise resources associated with the user, comprising:
identifying relationships between the profile and enterprise resources;
determining, using the model, similarities to known security vulnerabilities based on the relationships, wherein the model utilizes a machine learning technique, wherein the model is trained using a set of known security vulnerabilities; and
determining whether a security vulnerability to an enterprise resource exists based on the similarities; and
performing, using the processor, an action in response to the one or more detected security vulnerabilities based on a policy.

9. The method of claim 8, wherein the plurality of sites includes a social media site and/or a people search database.

10. The method of claim 8, wherein the action includes one or more of the following: generate an alert, generate a report, and/or generate an email.

11. The method of claim 8, wherein the action includes removing one or more pieces of the predetermined user information from the Internet.

12. The method of claim 8, wherein the action includes making private a social media site, so that information associated with the user is not publicly available.

13. The method of claim 8, wherein the action includes adding multifactor authentication to the one or more enterprise resources associated with the user in the event that the one or more enterprise resources do not already have multifactor authentication.

14. The method of claim 8, further comprising:
   identifying a new social media resource attack and/or a new social engineering type attack; and
   updating the model based on the new social media resource attack and/or the new social engineering type attack.

15. A computer program product embodied in a non-transitory computer readable medium and comprising computer instructions for:
   monitoring a plurality of sites;
   extracting predetermined user information for a user from the plurality of monitored sites to generate a profile of the user;
   analyzing, using a model, the profile of the user to detect whether one or more security vulnerabilities exist for social engineering attacks for one or more enterprise resources associated with the user, comprising:
      identifying relationships between the profile and enterprise resources;
      determining, using the model, similarities to known security vulnerabilities based on the relationships, wherein the model utilizes a machine learning technique, wherein the model is trained using a set of known security vulnerabilities; and
      determining whether a security vulnerability to an enterprise resource exists based on the similarities; and
   performing an action in response to the one or more detected security vulnerabilities based on a policy.

* * * * *